Nov. 26, 1963  G. R. SPIES, JR  3,111,980
GAS TORCH AND VALVE
Filed Dec. 12, 1961
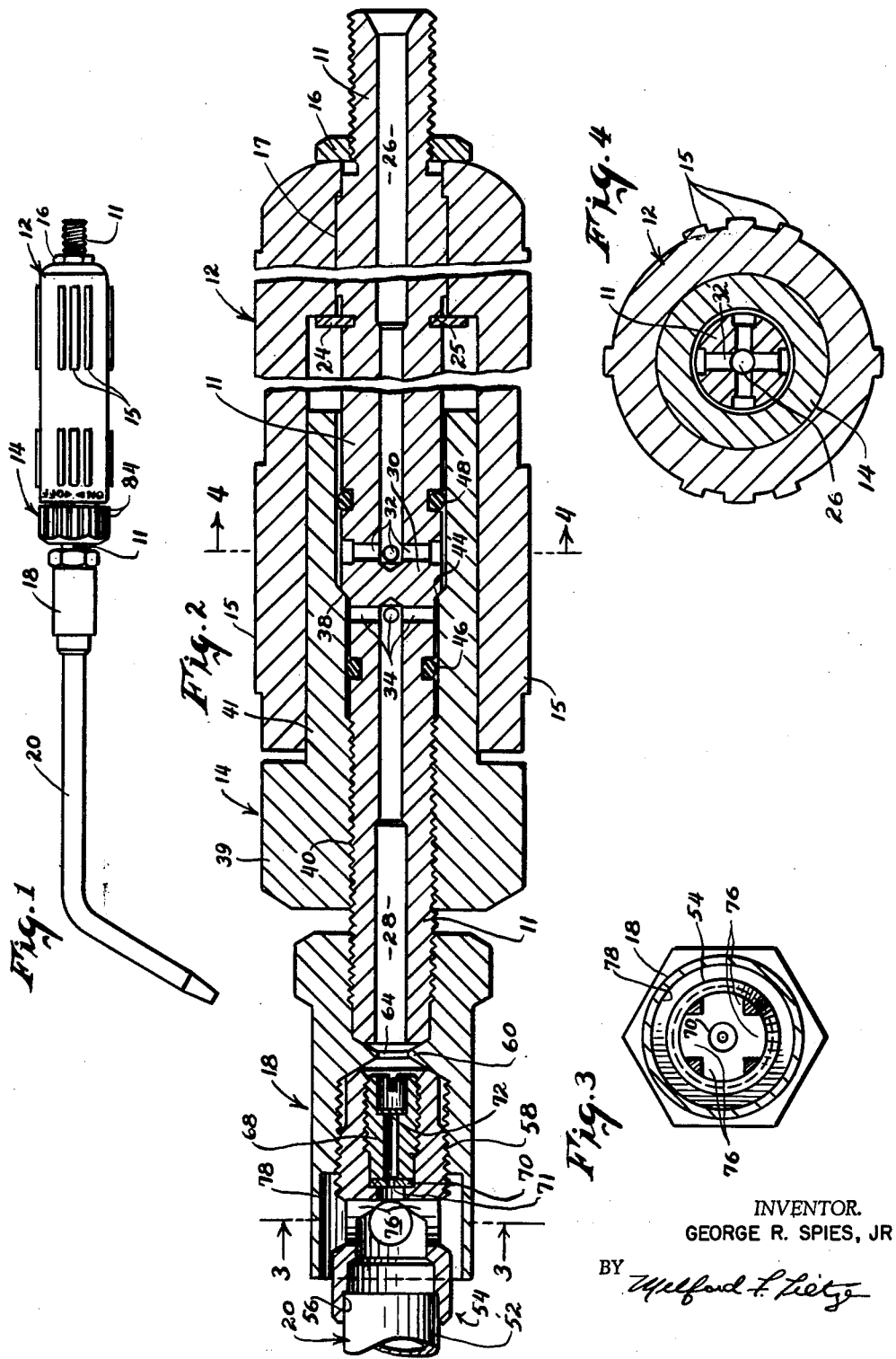
INVENTOR.
GEORGE R. SPIES, JR
BY *Milford F. Lietze*

United States Patent Office 3,111,980
Patented Nov. 26, 1963

3,111,980
GAS TORCH AND VALVE
George R. Spies, Jr., Murray Hill, N.J., assignor to Air Reduction Company, Incorporated, New York, N.Y., a corporation of New York
Filed Dec. 12, 1961, Ser. No. 158,786
3 Claims. (Cl. 158—27.4)

This invention relates to torches and to torch constructions for providing valve means to control the flow of gas through the torch. The invention is primarily concerned with air-fuel gas torches but can be used for controlling flow through one gas passage in various combinations.

It is an object of the invention to provide an improved torch in which the flow of gas through the torch can be controlled by rotating an element which surrounds the torch and which is preferably located in a position to form, in effect, an extension of the torch handle.

In the preferred construction, the body of the valve which controls the gas flow extends around the stem of the torch at a location beyond the handle and in a convenient position to be rotated to regulate the gas flow. This construction, which makes the manual operator for the valve a part of the valve body, simplifies the construction of the torch.

Another object of the invention is to provide an improved valve which has a body surrounding the passage through which the gas flows. Valves of this type have commonly been made with gas passages located in alignment with one another but separated by a partition. Radial openings through the walls of the passages have been provided on opposite sides of the partition and these passages have been put in communication with one another by moving a valve body which surrounds the passages. These valves have been slide valves movable axially with respect to the passages.

When applied to a torch, the disadvantage of slide valves, of the character indicated, is that operator of the torch cannot tell by the feel of the valve whether it is in open or closed position, and such valves have slack motion before the valve actually begins to open.

It is another object of this invention to provide a valve in which the valve body surrounds the stem having the gas passages and to obtain a firm feeling of resistance or stopping at the instant of complete closure of the valve.

It is a further object to avoid slack motion when moving the valve before actual opening commences, and to achieve a metering or control effect as the valve is opened gradually, so that a torch flame adjustment can be accomplished with precision.

Another object is to improve the safety of torches, having valves of the character indicated, by enabling an operator immediately to determine by feel whether the valve is opened or closed. This prevents an accident which could result if the gas were turned on at its source with the torch valve unknowingly open.

Another object is to construct a valve having the sealing lip and stopping surface of one-piece construction so as to effect more economical manufacture as compared with valves using separate members, such as a retaining ring for the stopping action and an O-ring or similar device for the sealing action.

Other objects, features and advantages of the invention will appear or be pointed out as the description proceeds.

In the drawing, forming a part hereof, in which like reference characters indicate corresponding parts in all the views;

FIG. 1 is an assembly view showing a torch constructed in accordance with this invention;

FIG. 2 is a greatly enlarged fragmentary, sectional view of the torch shown in FIG. 1; and FIGS. 3 and 4 are sectional views taken on the lines 3—3 and 4—4, respectively, of FIG. 2.

The torch shown in FIG. 1 includes a stem 11 which is surrounded along a portion of its length by a handle 12, and along another portion of its length by a valve body 14. The handle 12 is shown with ribs 15 to provide a better grip for the operator's hand, and the rearward end of the stem 11 (the right-hand end in FIG. 1) is threaded and has a nut 16 on the threads for preventing movement of the handle 12 rearwardly. At the engaging interface 17 between the stem 11 and handle 12, these parts are suitably proportioned to create a substantially force type fit so as to render the handle substantially rigidly seated on the stem. Advantageously, the contiguous face of one or both parts may be formed with serrations so as to afford greater rigidity against rotational movement between the handle and the stem member.

At the forward end of the stem 11, there is an adapter 18 which screws on the stem; and there is a tip 20 connected to the adapter 18.

FIG. 2 shows the structure of FIG. 1 in section, but with the tip 20 broken off to permit the drawing to be on a larger scale. The nut 16 clamps the handle 12 against a shoulder on the stem 11; and this shoulder is preferably formed by inserting a snap ring 24 into a groove 25 in the circumference of the stem 11.

The stem 11 has a passage 26 extending through it from the rearward end of the stem; and has a corresponding passage 28 extending inwardly from the forward end of the stem. These passages 26 and 28 are preferably in alignment with one another and on the longitudinal axis of the stem 11. They are separated from one another, however, by a partition 30 located at an intermediate point between the ends of the stem 11.

On one side of the partition 30 there are radial passages 32 extending from the passage 26 through the peripheral surface of the stem 11. On the other side of the partition 30 there are corresponding radial passages 34 extending from the passage 28 through the peripheral surface of the stem 11. The passages 32 open through the outer surface of the stem 11 at a location where the diameter of the stem is somewhat larger than at the location of the radial passages 34. There is a shoulder 38 on the stem 11 where the diameter changes.

The valve body 14 has a flange 39 at one end and this flange serves as an actuator for rotating the valve body which is attached to the stem 11 by threads 40 so that rotation of the valve body causes it to move axially along the stem 11. Beyond the threads 40, the valve body 14 has a portion comprising a sleeve 41 that extends lengthwise along the portions of the stem 11 through which the passages 32 and 34 open. The inside diameter of the valve body 14, in the region of the passages 32 and 34, is somewhat larger than the outside diameter of the corresponding parts of the stem 11 so that there is an annular clearance between the stem 11 and the valve body 14. The radial passages 32 and 34 open into this annular clearance.

There is a shoulder 44 on the inside surface of the valve body 14 and corresponding to the shoulder 38 on the stem 11. When the valve body 14 is rotated on the threads 40 in one direction, it advances rearwardly along the stem and brings the shoulder 44 of the valve body 14 into contact with the shoulder 38 on the stem 11.

There are seals 46 and 48 across the clearance between the stem 11 and the valve body 14. In the preferred construction, these seals 46 and 48 are O-rings located in circumferential grooves in the stem 11. These grooves could be in the inside surface of the valve body 14 instead of being in the outside surface of the stem 11, but the construction shown makes assembly of the apparatus more convenient. The seal 46 is located ahead of the radial passages 34; and the seal 48 is located behind the radial passages 32.

Gas flowing through the passage 26, from a suitable source beyond the torch, flows outwardly through the radial passages 32 and into the clearance between the stem 11 and the valve body 14. When the shoulder 38 is in contact with the shoulder 44, the gas can flow no farther forward, and the seal 48 prevents it from flowing rearwardly. Under these circumstances, the valve is closed.

When the valve body 14 is rotated on the threads 40 in a direction to cause the shoulder 44 to move away from the shoulder 38, a clearance is provided between the shoulders and a gas flows through this clearance and into the annular clearance into which the radial passages 34 open. The gas flows inwardly through these passages 34 and along the passage 28 into the adapter 18 where the gas enters the tip 20 and flows through the tip 20 to the discharge end of the tip.

Provision is made for mixing air with the gas at the rearward end of the tip and within the adapter 18. The tip construction for obtaining this result is shown in FIGS. 2 and 3.

The tip 20 includes a tubular portion 52 and an end fitting 54 having a socket 56 into which the tubular portion seats and to which the tubular portion is secured by hard solder or other bonding means. The fitting 54, which is an integral part of the tip 20, has threads 58 that screw into a socket in the adapter 18 until the end of the fitting 54 abuts against the end wall of the socket. There is a partition 60 which forms the end wall of the socket into which the fitting 54 screws, and the other side of this partition 60 provides the bottom for a socket into which the forward end of the stem 11 screws. There is a center opening 64 through the partition 60 for passage of gas from the stem 11 to the tip 20.

The fitting 54 has a counterbore into which a bushing 68 is screwed. This bushing 68 clamps a plate 70 against the end of the counterbore; and this plate 70 has a metering port opening 71 through it for determining the rate of flow of gas at a given pressure. The plate 70 can be replaced with other plates having metering ports of different diameters in accordance with the desired gas volume and velocity which are desired on the downstream side of the metering plate 70. In the illustrated construction there is a screen 72 in the gas passage through the bushing 68. Alternatively, the metering disc 70 may be an integral part of the bushing member 78 such as by forming the bushing with an end closure containing the metering port opening 71.

Just beyond the metering plate 70, there are radial openings 76 through the wall of the fitting 54. There is a counterbore 78 in the adapter 18 with an inside diameter substantially larger than the outside diameter of the fitting 54. This provides an annular space around the outer ends of the openings 76, and this annular space is open to the atmosphere at the forward end of the adapter 18.

Gas discharging through the opening at the center of the metering plate 70 produces an aspirating action and creates a suction at the inner ends of the openings 76 so that atmospheric air is drawn into the annular space in the counterbore 78, and is drawn from this space through the openings 76 and into the fitting 54. This air mixes with the gas discharged through the metering plate 70, and during passage of this air with the gas through the length of the tip 20, the air and gas become thoroughly mixed. At the discharge end of the tip 20 the mixture burns with a uniform and even flame.

When the operator desires to increase the size of the flame, he turns the valve body 14 in a direction to move the shoulders 38 and 44 farther apart. This increases the gas flow, and also increases the velocity of the gas stream through the metering plate 70 so that more air is drawn into the stream. Conversely, the size of the flame can be decreased by turning the valve body 14 in a direction to move the shoulders 38 and 44 closer together.

When the valve body 14 is turned far enough to bring the shoulders 38 and 44 into contact with one another, to completely shut off the gas flow, the operator is conscious of the closing of the valve because of the sudden and hard resistance encountered by the valve body 14.

Advantageously, the stem 11 may be made of metal, such as brass, and the valve body 14 made of a suitable rigid plastic material, such as nylon, which can conveniently be molded to the desired shape. There are ribs 84 on the portion of the valve body 14 which is used for manual manipulation of the valve body, but since these ribs and their adjacent part of the valve body are of integral construction with the shoulder 44, there is no lost motion in the valve when opening it and the operator can always tell by the feel whether the valve is in open or closed position. This increases the safety of the valve, as previously explained.

The preferred embodiment of the invention has been illustrated and described, but changes and modifications can be made and some features can be used in different combinations without departing from the invention as defined in the claims.

What is claimed is:

1. A torch including a stem having opposite end faces with passages opening therethrough, a partition within the stem and on the opposite sides of which the passages from the opposite end faces terminate whereby the partition forms an end wall for each of the passages, radial openings from each of the passages and through the peripheral surface of the stem at longitudinally-spaced locations and at opposite sides of the partition, a circumferential shoulder on the stem between said longitudinally-spaced locations, a handle for the torch surrounding a portion of the stem, a valve body that fits over the periphery of the stem with some clearance therebetween and along the length of the stem having the radial openings therein, a shoulder within the valve body in position to contact with the shoulder on the stem to prevent flow of gas along said clearance, seals between the stem and valve body beyond both of the radial opening locations, and actuator means for moving the valve body longitudinally with respect to the stem to move the shoulders into and out of contact with one another, the actuator means including a manually-operated element at one end of the handle, and in which the valve body extends into the handle and the means for moving the valve body longitudinally with respect to the stem includes cooperating cam surfaces connected with the stem and valve body for imparting longitudinal relative movement to the valve body and stem in response to relative movement of said surfaces that are connected to the valve body and the stem.

2. The torch described in claim 1 and in which the cooperating cam surfaces are screw threads by which the valve body is connected with the stem.

3. A torch including a stem having opposite end faces with passages opening therethrough, a partition within the stem and on the opposite sides of which the passages from the opposite end faces terminate whereby the partition forms an end wall for each of the passages, radial openings from each of the passages and through the peripheral surface of the stem at longitudinally-spaced locations and at opposite sides of the partition, a circumferential shoulder on the stem between said longitudinally-spaced locations, a handle for the torch surrounding a portion of the stem, a valve body that fits over the periphery of the stem with some clearance therebetween and along the length of the stem having the radial openings therein, a shoulder within the valve body in position to contact with the shoulder on the stem to prevent flow of gas along said clearance, seals between the stem and valve body beyond both of the radial opening locations and actuator means for moving the valve body longitudinally with respect to the stem to move the shoulders into and out of contact with one another, the actuator means including a manually-operated element at one end of the handle, and in which the torch handle covers most of the outside of the valve body, there being a portion of the valve body ahead of the handle for moving the valve body with respect to the handle and the stem, the handle having an inside surface that serves as a bearing in which the valve body moves with respect to the handle and the stem.

References Cited in the file of this patent

UNITED STATES PATENTS

| | | |
|---|---|---|
| 2,436,617 | Svet | Feb. 24, 1948 |
| 2,666,479 | Clinton | Jan. 19, 1954 |
| 2,763,322 | Eichelman | Sept. 18, 1956 |
| 2,865,596 | Monnig | Dec. 23, 1958 |
| 2,971,742 | Fausek et al. | Feb. 14, 1961 |

FOREIGN PATENTS

| | | |
|---|---|---|
| 367,899 | France | Sept. 19, 1906 |
| 308,118 | Switzerland | Sept. 1, 1955 |